April 7, 1936.                G. S. FROST                2,036,572
                               RECEPTACLE
                           Filed Aug. 8, 1935
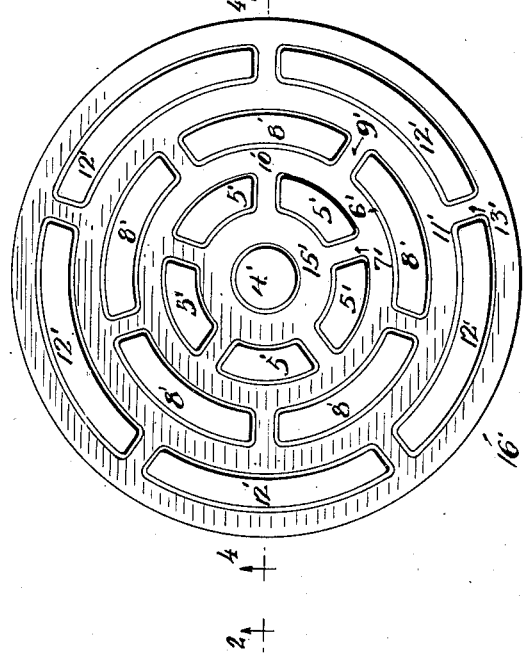
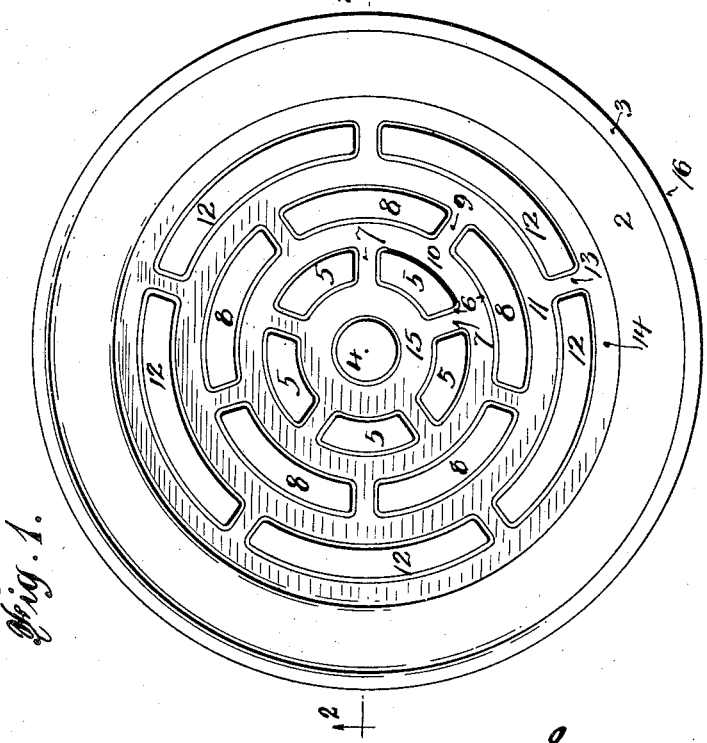
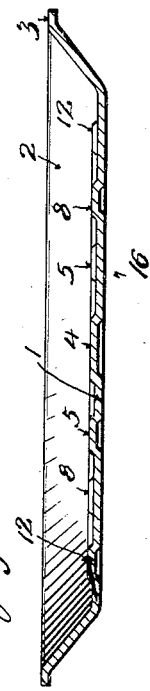
INVENTOR
George S. Frost
BY
Charles G. Hensley
ATTORNEY Patented Apr. 7, 1936

2,036,572

UNITED STATES PATENT OFFICE 2,036,572

RECEPTACLE

George S. Frost, Baldwin, N. Y.

Application August 8, 1935, Serial No. 35,242

5 Claims. (Cl. 229—2.5)

My invention relates to pie plates, cake platters, and various other articles made of pulp, preferably by the suction process. In making pie plates and similar articles having a flat bottom, or nearly flat bottom, from pulp, the bottom wall has a tendency to warp when the article is dried out, so that the bottom wall either arches upwardly in the middle, or arches downwardly. In the case of a pie plate, not only does the bottom wall arch when dried, but the plate bends so easily in different directions that it is difficult to pick up the plate with the pie on it, by gripping the rim or flange of the plate, as the bending action of the plate is so great as to break the pie or dislodge it from the plate.

There are two main objects in my invention, one of which is to provide raised portions or embossings, disposed about the bottom or supporting wall of the plate or dish, in such a manner as to stiffen the article in all directions to prevent the article from warping after it has been formed by the suction method, and after it has been dried, so that the bottom or supporting wall remains in a flat plane except for the raised embossings; that is to say, the bottom surface of the bottom wall throughout the unembossed portions remains in a flat plane. These embossings are such as to resist bending in every direction, whereas in cases where it has been proposed to emboss plates and similar articles they have been stiffened in certain directions but left relatively weak in other directions or between the embossings, whereas in the present case the wall is stiffened in every direction.

Another object of my invention is to provide embossings of such shape as to obtain the stiffening action referred to, and at the same time to provide channels for vapors or moisture exuded from the pie or other food product, after it has been put in the plate, in order that these vapors may be dissipated and not be absorbed by the plate. These channels formed between the various embossings are not direct but tortuous, but nevertheless provide a complete passage from the center portion of the plate outwardly to the rim, not because there is any advantage in making the passages tortuous, but to obtain the advantages of rigidity of the plate bottom in all directions and at the same time permit the vapors to dissipate through the passages.

Where the invention is embodied in a pie plate the pie may be placed on the plate as soon as it is removed from the oven, and slipped from the metal plate in which it is baked onto the pulp plate, or while still hot and before the vapors have entirely passed from the pie. This is in cases where the present plate is used as a slip plate.

Even where the receptacle is not used for receiving freshly baked or hot food products, it may be employed for the stiffening advantages recited herein, because the embossing arranged in the manner hereinafter described retain the bottom wall more rigid and in a flat plane than any type of embossing heretofore proposed.

Other advantages will be set forth in the following detailed description of my invention.

In the drawing forming part of this application,

Figure 1 is a face view of a pie plate embodying my invention in the preferred form, Figure 2 is a sectional view taken on the line 2—2 of Figure 1, Figure 3 is a face view of a coaster embodying my invention, and Figure 4 is a sectional view taken on the line 4—4 of Figure 3.

Referring to the construction shown in Figures 1 and 2, I have shown a receptacle adapted to be used as a pie plate. This receptacle is made from pulp by the suction method and a die or mould will be formed to produce the parts which I am about to describe. The plate or dish includes a bottom wall, 1, which lies principally in a flat plane and from the outer portion of this bottom wall extends upwardly and outwardly a frusto-conical wall 2 which at the top may be provided with a small lateral flange 3 if desired.

There is a series or form of embossings disposed around the bottom wall of the plate, which are designed to make the plate more rigid and to resist distortion of the bottom wall when the pulp material has been formed and has been allowed to dry. Usually the bottom wall 1 when made plain or flat, warps either upwardly or downwardly at the middle so that the bottom wall is no longer flat. Furthermore, the whole plate bends easily and it will not properly support the pie, especially when the plate is lifted by grasping one portion of the frusto-conical wall.

In the present case I provide a series or group of embossings arranged preferably in concentric relation, the embossings being interrupted in order to provide passages through which steam and vapor from the pie which is placed in the plate will escape between the major portion of the bottom of the plate and the bottom surface of the pie. The pie rests on the top of the embossings, thus leaving the spaces referred to for the escape of vapor.

In the drawing I have shown a small round central embossing 4. Arranged concentrically around this central embossing are the arcuate or raised embossings 5 each of which is complete or independent of the other, with vertical portions 6 disposed between the top face of each embossing and the top face of the flat portion of the bottom wall adjacent thereto. As stated, these embossings are arranged concentrically around the center embossings and there are lateral spaces 7 between the several embossings 5 because the bottom wall is flat or unembossed where these lateral openings occur. The embossings 5 are preferably arcuate in shape as shown.

Arranged concentrically around the embossings 5 I have shown another series of arcuate embossings 8 and preferably these are longer than the embossings 5. The embossings 8 are also independent of each other and are spaced from each other at their ends to provide lateral passages 9 which communicate with the flat or unembossed annular portions 10, 11 of the bottom wall of the plate lying between the embossings 5, 8 and 8, 12. It will be noted that the lateral spaces 9 disposed between the embossings 8 are out of line with or break-joint with relation to the lateral spaces 7 between the embossings 5 for a purpose which will be set forth hereinafter.

I have shown another set of arcuate embossings 12 which are arranged concentrically around the embossings 8 but spaced therefrom to provide an annular flat portion 11 between embossings 8 and embossings 12. Preferably, the embossings 12 are longer than the embossings 8 as shown in the drawing. Each of these embossings are independent of the other and I have shown lateral passages 13 between the ends of these embossings caused by the intervening flat portion of the bottom wall of the plate.

These lateral passages are in communication with the annular flat portion 11 of the bottom wall and also in communication with the flat portion 14 of the bottom wall outside of the several embossings 12. The lateral passages 13 are out of alignment with the lateral passages 9.

If a pie is placed in the plate, the bottom of the pie will rest on the tops of all the embossings, and if the article is designed as shown in the drawing, about 40% of the bottom surface of the pie will be in contact with the top surfaces of the embossings. If the pie is placed in the plate while still hot and while still giving off vapors, the vapors passing from the bottom of the pie will enter the several concentric flat portions 15, 10, 11, 14 of the bottom wall; and the vapors will pass out from the middle portion of the pie through the lateral passages 7, into the annular space 10 and from there they will pass through the lateral spaces 9 into the annular space 11 and from there they will pass through the lateral passages 13 into the space 14, and from there they will pass off under the rim of the pie to be disbursed.

From this it will be apparent that I have provided suitable spaces and passages for the vapors to pass freely out from the bottom of the pie in order that these vapors will not be retained in the pie nor be absorbed into the pie plate.

The several embossings are so disposed and the several lateral passages are so disposed that the embossings stiffen the bottom wall of the plate in all directions. In other words, all radial or lateral lines which may be struck across the bottom wall of the plate will intersect several of the different embossings, and as these embossings stiffen the material of the bottom wall wherever they are located, they will resist bending of the bottom wall in all directions.

Not only will these embossings prevent the bottom wall from becoming distorted or moving out of the flat plane while the pulp is being dried, but after the pulp has been dried and the plate is put into use, the bottom wall is rendered stiff in all directions so that when the plate is picked up it will not bend and distort or break the pie.

I have found that embossings arranged in the manner here described hold the bottom wall in a flat plane and resist bending to a much higher degree than any type of embossing heretofore proposed. On the other hand, by arranging the embossings with the lateral passages described above, the vapors from the pie may quickly dissipate through the passages. The passages formed as described herein in no way detract from the stiffening action of the embossing. In fact, by making the arcuate embossings 5, 8 or 12 in separate segments instead of in single annular rings, the stiffening action of the embossings is increased.

In Figures 3 and 4 I have shown my invention embodied in a coaster which may be of any size. Coasters are commonly used on tables to rest glasses, bottles, coffee pots and the like, upon them, to protect the table, and while coasters have been made of pulp material they also have a tendency to warp, thus making an uneven support. By embodying my invention in a coaster the latter remains permanently in a flat plane. In these views I have shown a coaster 16 consisting of a flat plate portion with the embossings distributed thereover in the manner described.

I have shown the same type of embossings as illustrated in connection with the pie plate, that is to say, there is a central embossing 4' corresponding with the embossing 4 in the pie plate. Around this embossing is an annular flat portion 15' and then there is a series of arcuate embossings 5' corresponding with the embossings 5 in the pie plate.

Preferably the embossings 5' are arcuate in shape and they are separated by the flat portions 7' forming lateral passages from the annular portion 15'. I have shown another series of embossings 8' of arcuate shape and disposed concentrically around and spaced from the embossings 5' with an intervening annular flat area 10' between them.

Preferably the embossings 8' are longer than the embossings 5'. The embossings 8' are separated by the intermediate flat portions 9' which form lateral passages extending from the annular flat area 10' which lies between the embossings 5' and 8'. I have shown another series of embossings 12' of arcuate shape disposed concentrically around the embossings 8' and spaced therefrom to leave an annular flat area 11'. There are lateral passages 13' between the embossings 12'.

If desired, the coaster may be treated with water-proofing material under any well known method to render it non-absorbing, so that any moisture on the article placed on the coaster will not be absorbed by the latter. The number of sets of arcuate embossings may be greater or less than that shown in the drawing and the number and size will usually depend upon the size of the coaster. A coaster made in accordance with my invention will not only come out flat after the process of manufacture by the suction pulp method but it will tend to remain in flat condition when put into use. When a hot object is laid on the coaster the tendency of the heat from the object to warp the coaster is resisted by the stiffening action of the embossing. Furthermore, the heat from the bottom of the object, say a coffee pot, can pass out through the several spaces, like the vapors from the pie on the pie plate, and this excessive heat will not reach the table top and injure it. Where a glass of ice-cooled drink is placed on the coaster, it will stay cold longer than where placed on an unembossed coaster.

I prefer to stagger the lateral passages 7', 9' and 13' in the manner shown in order that the embossings will stiffen the coaster in all directions and also to allow heat from the article placed on the coaster to pass off.

Having described my invention, what I claim is:

1. An article of the character described having a plane wall to receive an article or product thereon, said wall being formed of pulp material and having corrugated embossings thereon projecting from the plane of the wall, said embossings being arranged in a series of concentric rings, each ring composed of arcuate, separate embossed members spaced from each other by flat portions of said wall to form lateral passages between said members, the lateral passages between the members of one ring being offset or out of line with the lateral passages between the members of adjacent rings.

2. An article of the character described having a plane wall to receive an article or product thereon, said wall being formed of pulp material and having corrugated embossings thereon projecting from the plane of the wall, said embossings being arranged in a series of concentric rings, each ring composed of separate embossed members spaced from each other by flat portions of said wall to form lateral passages, the lateral passages between the embossed members of one ring being disposed on different radial lines than those of adjacent rings, whereby said lateral passages will be offset in relation to each other, the embossed members of the smaller rings being of shorter length than the embossed members of relatively larger rings.

3. A pie plate of pulp material including a plane, bottom wall and a frusto-conical outer wall, said bottom wall having corrugated embossings thereon projecting from the plane of the bottom wall of the plate, said embossing being arranged in a series of concentric rings, each ring composed of arcuate separate embossed members spaced from each other by the flat portion of said wall to form lateral passages, the lateral passages between the embossed members of one ring being offset or out of line with the lateral passages of adjacent rings.

4. A pie plate made of pulp material and including a bottom wall and a frusto-conical wall, said bottom wall having corrugated embossings thereon, projecting from the plane of the wall, including a circular embossing in the center of the plate and other embossings arranged in a series of concentric rings, each ring composed of arcuate separate embossed members spaced from each other by flat portions of said wall to provide lateral passages, the lateral passages between the members of one ring being offset or out of alignment with the lateral passages of adjacent rings.

5. A coaster including a plane wall formed of pulp material and having corrugated embossings thereon projecting from the plane of said wall, said embossings being arranged in a series of concentric rings, each ring composed of separate embossed members spaced from each other by flat portions of said wall to form lateral passages, the lateral passages between the embossed members of one ring being offset or out of alignment with the lateral passages of the adjacent ring.

GEORGE S. FROST.